(12) United States Patent
Christenson et al.

(10) Patent No.: US 11,035,815 B2
(45) Date of Patent: Jun. 15, 2021

(54) SYSTEM AND METHOD FOR MOBILE ION SURFACE TRAPPING IN A GAS DETECTION DEVICE

(71) Applicant: Carrier Corporation, Jupiter, FL (US)

(72) Inventors: John Carl Christenson, Prior Lake, MN (US); David P. Potasek, Lakeville, MN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 274 days.

(21) Appl. No.: 16/304,883

(22) PCT Filed: May 17, 2017

(86) PCT No.: PCT/US2017/033163
§ 371 (c)(1),
(2) Date: Nov. 27, 2018

(87) PCT Pub. No.: WO2017/205148
PCT Pub. Date: Nov. 30, 2017

(65) Prior Publication Data
US 2020/0326296 A1  Oct. 15, 2020

Related U.S. Application Data

(60) Provisional application No. 62/342,623, filed on May 27, 2016.

(51) Int. Cl.
*G01N 27/12*  (2006.01)
(52) U.S. Cl.
CPC .................................. *G01N 27/125* (2013.01)

(58) Field of Classification Search
CPC ..... G01N 27/12; G01N 27/122; G01N 27/125; G01N 27/128
See application file for complete search history.

(56) References Cited

U.S. PATENT DOCUMENTS

| 4,892,709 A | * | 1/1990 | Frese, Jr. ........... G01N 27/4162 |
| | | | 250/423 F |
| 6,774,613 B1 | | 8/2004 | Becker et al. |
| | | | (Continued) |

FOREIGN PATENT DOCUMENTS

| CN | 101458220 B | 5/2012 |
| DE | 4442396 A1 | 5/1996 |
| | (Continued) | |

OTHER PUBLICATIONS

Chowdhuri, Arijit, et al., "H2S gas sensing mechanism of SnO2 films with ultrathin CuO dotted islands", Department of Physics and Astrophysics, University of Delh, May 8, 2002, (Needs Page No.).
(Continued)

*Primary Examiner* — Benjamin R Schmitt
(74) *Attorney, Agent, or Firm* — Cantor Colburn LLP

(57) ABSTRACT

A gas detection device is provided having a substrate. A sensing element is coupled to the substrate and constructed and arranged to sense a target gas. A top surface is positioned on the sensing element opposite the substrate. A dopant is disposed within the sensing element. The dopant enhances the ability of the sensing element to sense the target gas. An electric field is applied to the dopant to constrain the dopant at or near the top surface of the sensing element.

8 Claims, 5 Drawing Sheets

(56) References Cited

U.S. PATENT DOCUMENTS

| | | | |
|---|---|---|---|
| 8,178,157 B2 | 5/2012 | Wei et al. | |
| 8,691,609 B1 | 4/2014 | Smith et al. | |
| 2011/0263036 A1* | 10/2011 | Blauw | G01N 27/4146 436/149 |

FOREIGN PATENT DOCUMENTS

| | | |
|---|---|---|
| DE | 19959925 A1 | 6/2001 |
| EP | 2372355 A2 | 10/2011 |
| JP | 2005017182 A | 1/2005 |

OTHER PUBLICATIONS

Rai, Radheshyam, "Study of structural and electrical properties of pure and Zn—Cu doped SnO2", abstract, Department of Physics, Indian Institute of Technology Delhi, Apr. 7, 2010, 1 page.

Anand, Manoj, "Study of tin oxide for hydrogen gas sensor applications", University of South Florida, 2005, 98 pages.

Bochenkov, V. E., et al., "Sensitivity, Selectivity, and Stability of Gas-Sensitive Metal-Oxide Nanostructures", American Scientific Publishers 2010, Metal Nanostructures and their Applications, vol. 3, Chapter 2, pp. 31-52.

Dengbaoleer, Ao, "Photochemical Deposition of SnO2 Thin Films for Hydrogen Sensor Applications", Department of Engineering Physics, Electronics and Mechanics, Graduate School of Engineering, Nagoya Institute of Technology, Nagoya, Japan, Mar. 2013, 92 pages.

Fine, George F., et al., "Metal Oxide Semi-Conductor Gas Sensors in Environmental Monitoring", abstract, Department of Chemistry, University College London, Mar. 30, 2010, 9 pages.

Gadkari, S.C., et al., "Solid State Sensors for Toxic Gases", Founder's Day Special Issue, 2005, pp. 49-60.

Galdikas, et al., "Peculiarities of surface doping with Cu in SnO2 thin film gas sensors", Sensors and Actuators B 43 (1997), pp. 140-146.

International Search Report and Written Opinion for application PCT/US2017/033163, dated Jul. 25, 2017, 11 pages.

Nisha, R. et al., "Development of semiconductor metal oxide gas sensors for the detection of NO2 and H2S gases", Department of instrumentation, Cochin University of Science and Technology, 2013, 2 pages.

Srivastava, J.K., et al., "Sensing Behavior of CuO-Doped SnO2 Thick Film Sensor for H2S Detection", International Journal of Scientific & Technology Research vol. 3, Issue 5, May 2014, 7 pages.

* cited by examiner

SYSTEM AND METHOD FOR MOBILE ION SURFACE TRAPPING IN A GAS DETECTION DEVICE

CROSS REFERENCE TO RELATED APPLICATION

The present application is an international patent application, which claims the priority benefit of U.S. Application Ser. No. 62/342,623, filed May 27, 2016, which is herein incorporated in its entirety.

TECHNICAL FIELD OF THE DISCLOSED EMBODIMENTS

The presently disclosed embodiments generally relate to gas detection devices, and more particularly, to a system and method for mobile ion surface trapping in a gas detection device.

BACKGROUND OF THE DISCLOSED EMBODIMENTS

Generally, gas detection devices are chemo-resistive devices, such that the sensors change electrical resistance upon contact with a target gas that the sensor is intended to detect. Many gas detection devices function through a surface reaction of the target gas with a sensing element that is impregnated with a dopant. In some sensors the dopants may include copper, gold, or silver. The gas detection device may operate at high temperatures and detect the presence of a plurality of target gases. A temperature of the sensing element determines the sensitivity and specificity of the sensing material to any one particular gas. Additionally, a chemo-resistive effect of the sensing element is greatly enhanced by the presence of the dopants in the sensing element.

To optimize the performance of the gas detection device, the dopants must largely reside on a surface of the sensing element, since gas sensing employs a surface reaction. However, the high operating temperatures, concentration gradients and other physical and chemical drivers can cause the dopants to migrate away from the surface of the sensing element, thus reducing the sensitivity of the sensing element to the target gas.

There remains a need for a gas detection device that facilitates retaining sensitivity of the sensing element by retaining the dopants at or near a top surface of the sensing element.

SUMMARY OF THE DISCLOSED EMBODIMENTS

In one aspect, a gas detection device is provided having a substrate. A sensing element is coupled to the substrate and constructed and arranged to sense a target gas. A top surface is positioned on the sensing element opposite the substrate. A dopant is disposed within the sensing element. The dopant enhances the ability of the sensing element to sense the target gas. An electric field is applied to the dopant to constrain the dopant at or near the top surface of the sensing element.

In an aspect of the above embodiment, the electric field is at least one of static or pulsed.

In an aspect of any one of the above embodiments, the electric field is time-varying.

In an aspect of any one of the above embodiments, the substrate is biased to form the electric field within the sensing element.

In an aspect of any one of the above embodiments, the electric field is formed above the surface of the sensing element.

In an aspect of any one of the above embodiments, a support is provided. An electrode is retained within the support. The electrode is biased to form the electric field.

In an aspect of any of the above embodiments, the support is perforated.

In an aspect of any one of the above embodiments, an electrode is separated from the sensing element by a dielectric material. The electrode forms the electric field.

In an aspect of any one of the above embodiments, an electrode is suspended above the surface of the sensing element. The electrode forms the electric field.

In an aspect of any one of the above embodiments, the substrate may function as an electrode that forms the electric field.

In one aspect, a method of improving a gas detection device is provided. The method includes providing a substrate and coupling a sensing element to the substrate. The sensing element is constructed and arranged to sense a gas. The sensing element has a top surface. The method also includes impregnating the sensing element with the dopant. The dopant enhances the ability of the sensing element to sense the gas. The method also includes applying an electric field to the dopant to constrain the dopant at or near the top surface of the sensing element.

In an aspect of the above embodiment, the method also includes applying at least one of a static electric field or a pulsed electric field.

In an aspect of any one of the above embodiments, the method also includes applying a time-varying electric field.

In an aspect of any one of the above embodiments, the method also includes biasing the substrate to form the electric field within the sensing element.

In an aspect of any one of the above embodiments, the method also includes forming the electric field above the surface of the sensing element.

In an aspect of any one of the above embodiments, the method also includes constructing a support over the substrate. The method also includes retaining an electrode within the support. The method also includes biasing the electrode to form the electric field.

In an aspect of any one of the above embodiments, the method also includes perforating the support.

In an aspect of any one of the above embodiments, the method also includes separating an electrode from the sensing element by a dielectric material. The method also includes forming the electric field with the electrode.

In an aspect of any one of the above embodiments, the method also includes suspending an electrode above the top surface of the sensing element. The method also includes forming the electric field with the electrode.

In an aspect of any one of the above embodiments, the method also includes forming the substrate to function as an electrode that forms the electric field.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
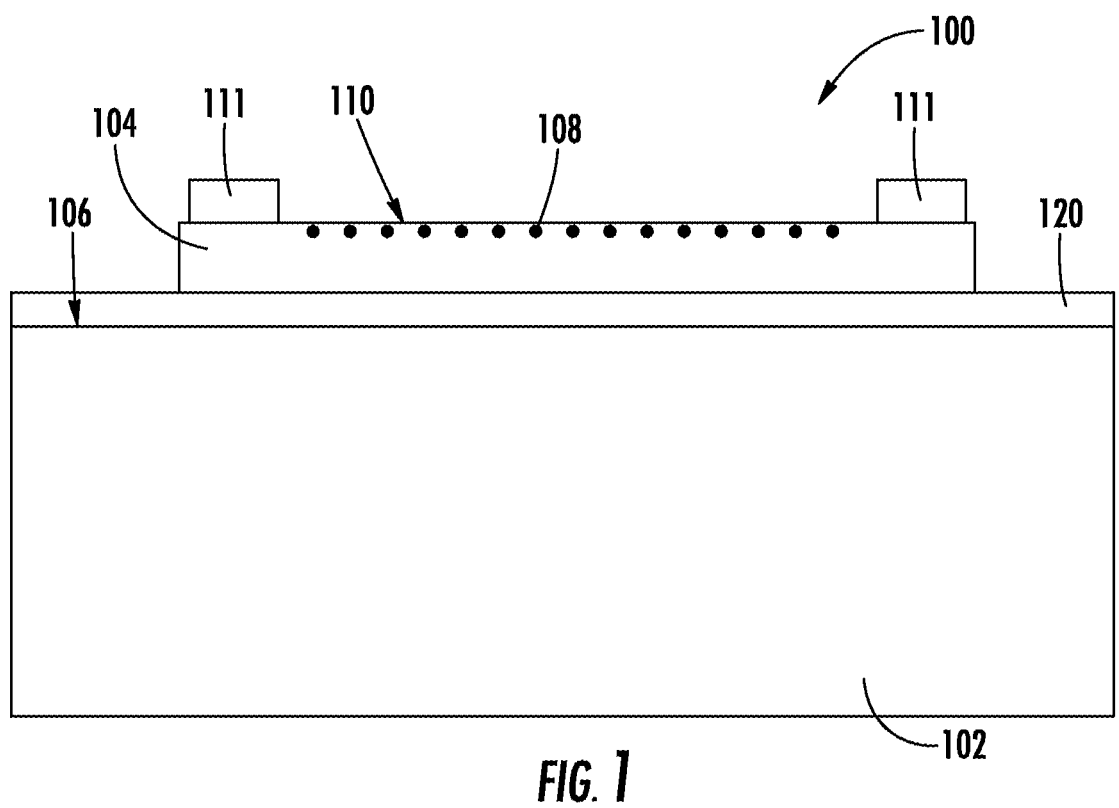
FIG. 1 is a schematic view of a gas detection device having dopants at a surface of a sensing element.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates a gas detector device 100 constructed on a substrate 102. In one embodiment, the gas detector device 100 may detect gases, such as, but not limited to, hydrogen, hydrogen sulfide, carbon monoxide, as well as gaseous hydrocarbons. Although the embodiments described herein are described in relation to a gas detection device, it will be appreciate by one of skill in the art that the embodiments may pertain to other detection devices or sensors, particularly devices or sensor that utilize a metal oxide for detection. In one embodiment, the substrate 102 is formed from ceramic, silicon, or the like. A chemo-resistive material (i.e. sensing element) 104 is disposed on the substrate 102 and may be thermally isolated from its surroundings.

In some embodiments, the sensing element 104 may be deposited onto the surface of the substrate 102, screen printed onto the substrate 102, or applied to the substrate 102 with the decomposition of a metalorganic. In other embodiments, the sensing element may be applied to the substrate 102 using deposition methods, such as, but not limited to, sputter, evaporation, chemical vapor deposition.

In one embodiment, the sensing element 104 may be formed from metal oxides, such as, tin oxide. In one embodiment, the sensing element 104 is formed from any sensor material that may employ a dopant or other catalyst material, wherein the dopant or catalyst material may migrate under the influence of a physical driving force including charge, concentration gradient, temperature, or chemical driving force including chemical reactions, absorptions, chemical affinities, or the like.

The gas detector device 100 may be heated via a heating element (not shown) to attain a desired temperature on the sensing element 104 on the dielectric films 120 that connect at least one conductive terminal 111. In one embodiment, conductive terminals 111 are connected, for example by wire bonds, to appropriate electronic circuitry within the detector device 100. In one embodiment, the conductive terminals 111 may function as electrical input/output terminals for the gas detection device 100. In operation, the sensing element 104 generally has a high electrical resistance; however, when exposed to a specific gas, the sensing element 104 experiences a drop in resistance of several orders of magnitude. This drop in resistance may be used to detect the presence and concentration of a target gas in different applications.

Figure 2:
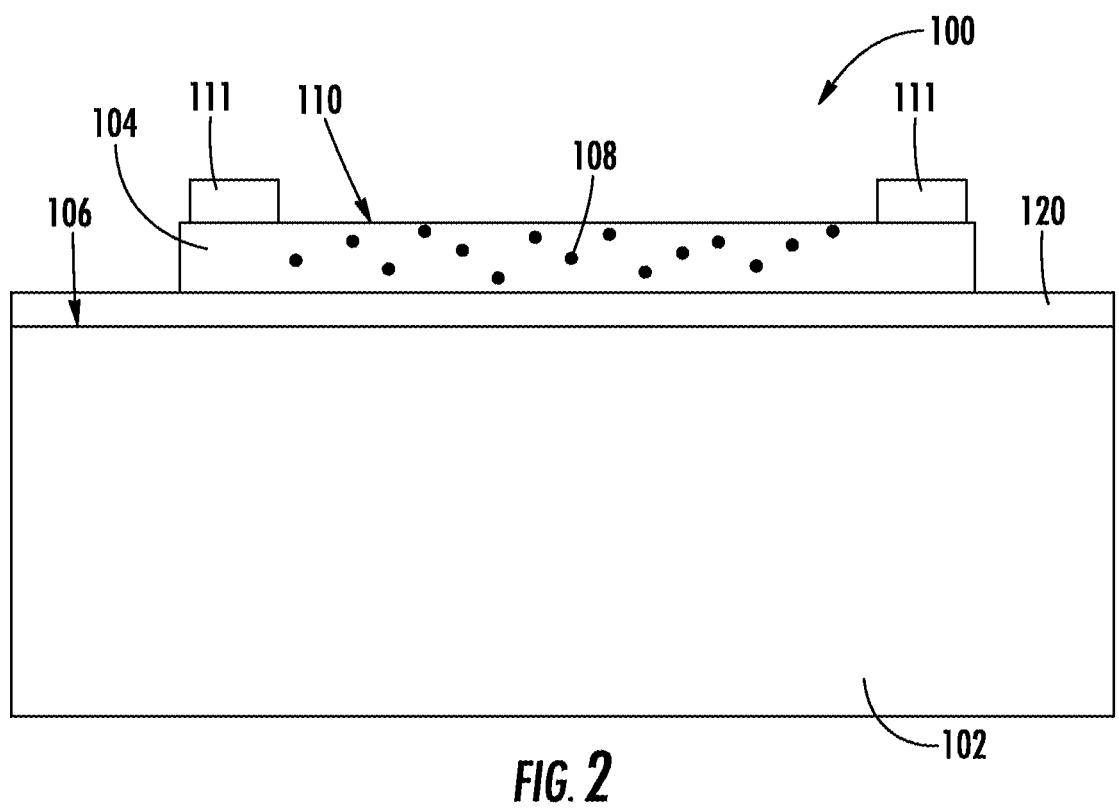
FIG. 2 is a schematic view of a gas detection device having dopants migrated throughout a sensing element, away from the surface of the sensing element.

As such, gas detector device 100 includes a dopant or catalyst 108 that is impregnated into the sensing element 104. In one embodiment, the dopant 108 may be applied as material disposed upon a surface in bulk, materials co-deposited with the sensing element materials, materials co-deposited with other dopant or catalyst materials, materials applied in layers with the sensing element materials, or the like. In one embodiment, the dopant 108 may be applied by chemical and physical processes. In one embodiment, the dopant 108 is applied using any application for impregnating the sensor element 104, any application order, any sets of layers, any bulk applications or the like, using any relative concentrations of dopants or catalysts disposed into or onto the sensing element 104. Surface doping is necessary for proper sensing element function; however, sensing element function is optimal when the dopant 108 remains on or near a top surface 110 of the sensing element 104, as illustrated in FIG. 1. Unfortunately, the dopant 108 has a tendency to migrate into the bulk of the sensing element 104 away from the top surface 110 of the sensing element 104, as illustrated in FIG. 2. This may result in the gas detector 100 having a low sensitivity and/or becoming inoperable to detect the target gasses.

Figure 3:
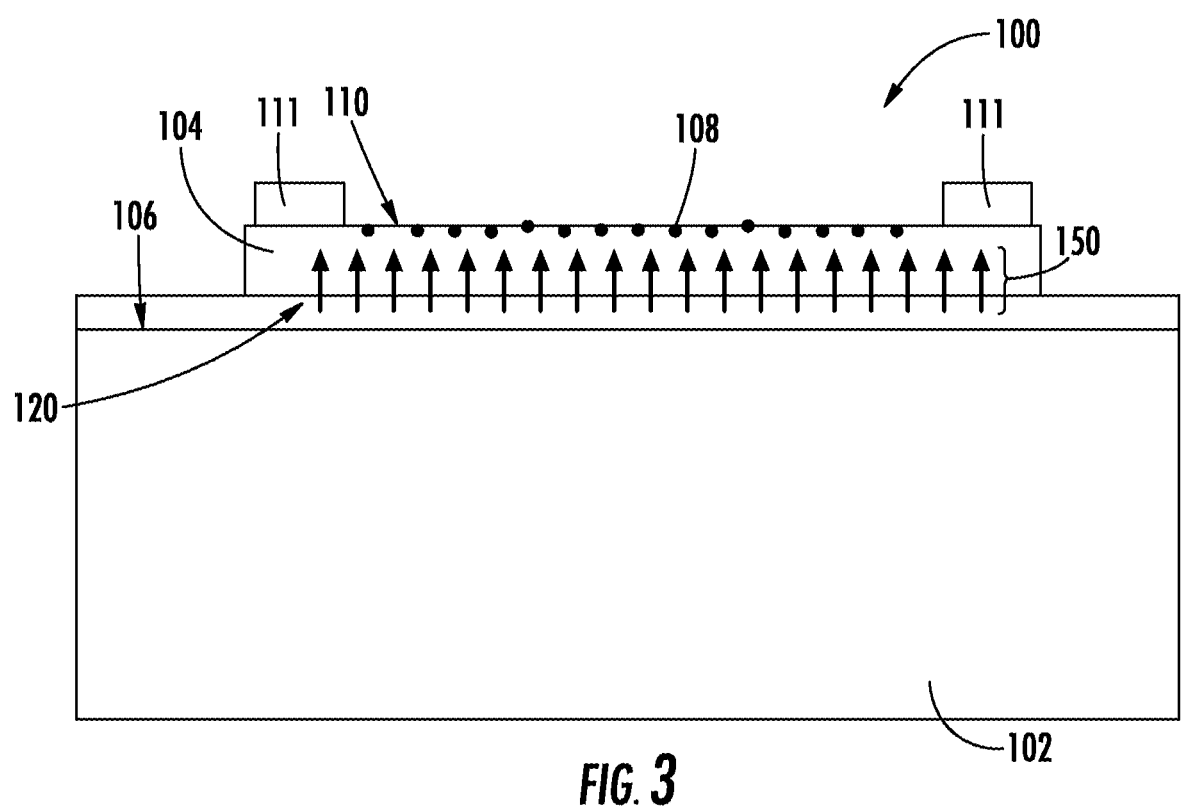
FIG. 3 is a schematic view of a gas detection device according to an embodiment having an electric field applied to the dopants.
Figure 4:
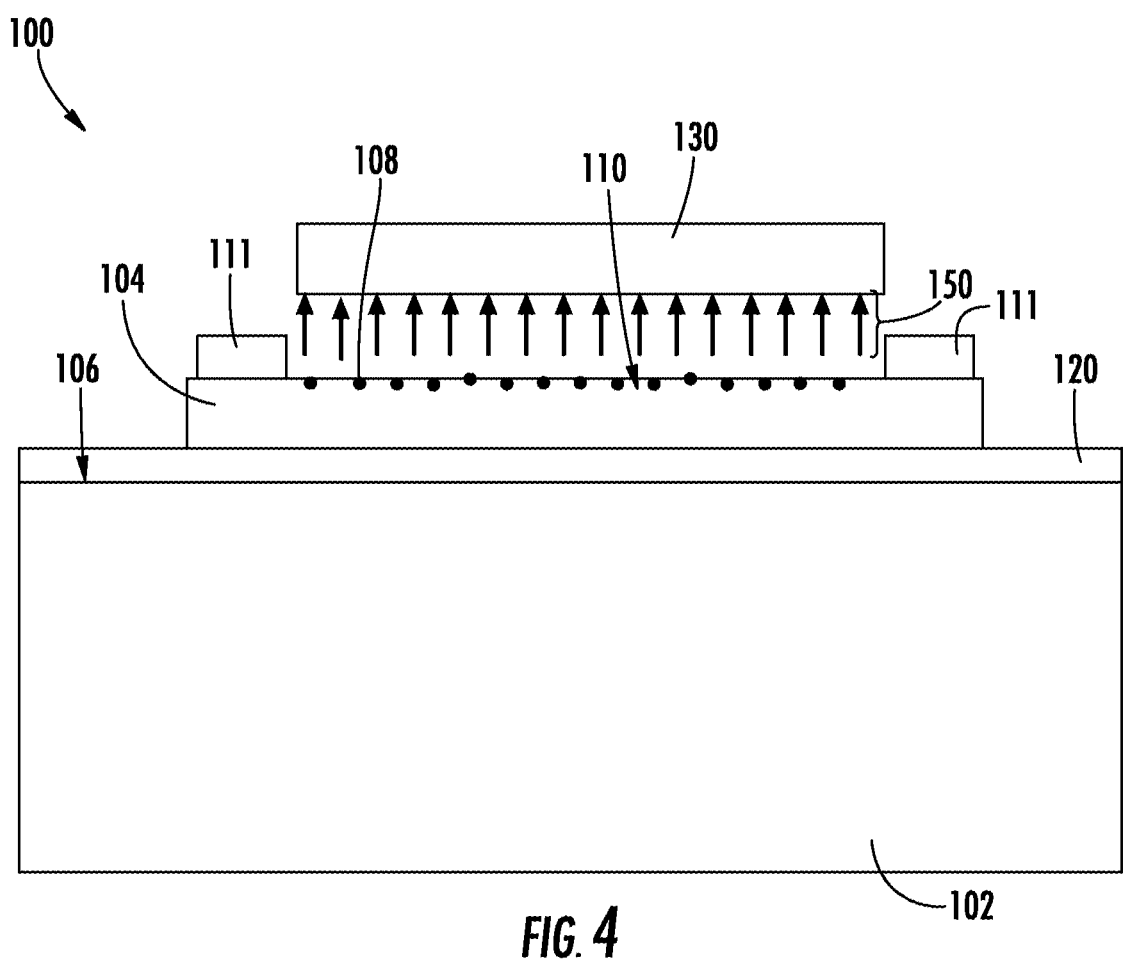
FIG. 4 is a schematic view of a gas detection device according to an embodiment having an electric field applied to the dopants.

FIGS. 3 and 4 illustrate the gas detector 100 having an electric field 150 to constrain the dopant 108 at or near the top surface 110 of the sensing element 104. Any method or material may be used to set up the electric field 150 proximal to the dopants 108 and the sensing element 104, such that the dopants 108 are forced to the top surface 110 of the sensing element. In one embodiment, constraining the dopant 108 may be possible if the dopant 108 is polar, ionic, or charged in nature, for example, but not limited to, copper (II) ion ($Cu^{2+}$) and copper (III) ion ($Cu^{3+}$). In one embodiment, the electric field 150 facilitates keeping the dopant 108 from migrating into the sensing element 104. In one embodiment, the electric field 150 facilitates keeping the positively charged dopant 108 at or near the top surface 110 of the sensing element 104, where the dopant 108 may participate in the surface reaction of the sensing element 104 and the target gas.

In one embodiment, depending on the nature of the dopant 108, the electric field 150 could be a positive field or a negative field. In one embodiment, if the electric field 150 is positioned below the surface 110 of the sensing element 104, and the dopant 108 has a positive charge, for instance, then the electric field 150 must be positive to move the positively charged dopants 108 to the surface 110 of the sensing element 104. In one embodiment, if the electric field 150 is positioned above the sensing element 104, and the dopants 108 are positively charged, then the electric field 150 must be negatively charged to attract the positively charged dopants 108 to the surface 110 of the sensing element 104. It may be further appreciated that if the electric field 150 is an alternating field of an appropriate strength, the net movement of the charged dopants 108 on and around the surface 110 of the sensing element 104 (or anywhere else in the sensing element 104) would have zero net displacement.

In one embodiment, the gas detector device 100 may be used to cause a certain first set of materials, i.e. dopants 108, dispersed within the bulk of a second material, i.e. the sensing element 104, to advantageously remain in their initial positions (locations) within the bulk of the second material. In one embodiment, the electric field 150 may be static or pulsed. In one embodiment, the amount of movement of the dopant 108 will depend on the strength of the electric field 150 and duration the electric field 150 applied to the dopant 108. Accordingly, in one embodiment, pulsed fields may need to be stronger than a static field to have the same effect. In one embodiment, the electric field 150 may be time varying. In one embodiment, the electrical bias forming the electric field 150 may be direct current or alternating current. In one embodiment, an alternating current may require a direct current offset such that the dopants 108 are not displaced when the polarity of the alternating current shifts. In one embodiment, alternating current electric fields 150 may function to keep the dopants 108 in their initial positions within the bulk of the sensing element 104 and/or at the top surface 110 of the sensing element 104, thereby allowing no net movement of the dopants 108.

In one embodiment, as illustrated in FIG. 3, the substrate 102 may be electrically biased to generate the electric field 150 within the sensing element 104 to move the dopant 108 to the top surface 110 and maintain the dopant 108 at or near the top surface 110. In such an embodiment, the sensing element 104 may be allowed to electrically float on the substrate 102. As used herein, the term "float" refers to applying an electrical bias to elements in the gas detector 100 other than the sensing element 104 to generate the electric field 150, which may affect the dopants 108. When the sensing element 104 is allowed to float, sensing element's 104 bias is not directly controlled, but rather the sensing element 104 assumes an electrical bias based on its electrical environment. Such an embodiment may be effective when the electrical resistance of the sensing element 104 is high. If the nominal resistivity of the sensing element 104 is high and conduction primarily occurs at the top surface 110 then the substrate 102 may be biased to a large positive voltage to create the electric field 150 that moves the dopant 108 to the top surface 110, as shown in FIG. 3, to facilitate preventing migration of the dopant from the top surface 110. In one embodiment, any combination of electrically biasing the substrate 102, biasing the sensing element 104, utilizing an electrode on or above the surface 110 of the sensing element 104, or applying a bias to any component on or around the surface 110 of the sensing element, such as to set up an appropriate electric field 150 needed to keep the dopant 108 at or near the surface 110 of the sensing element 104 may be utilized.

In an embodiment wherein the sensing element 104 does not have high enough resistance, an electrode 130 formed on or above the top surface 110 of the sensing element 104 may be employed, as illustrated on FIG. 4. Such an electrode 130 may be, but is not limited to, a micro-fabricated perforated electrode, a top electrode wafer, or a separate macro structure. In one embodiment, the electrode 130 is biased to a large negative voltage to generate an electric field 150 that moves the dopant 108 to the top surface 110, to facilitate preventing migration of the dopant from the top surface 110. The electric field 150 may move the dopant 108 to the top surface 110 regardless of a bulk conductivity of the sensing element 104. In an alternative embodiment, the electrode 130 is biased to a large positive voltage to generate the electric field 150.

In one embodiment, the electrode 130 is disposed upon the sensing element 104. In such an embodiment, the electrode 130 and the sensing element 104 are separated by an appropriate dielectric material. In one embodiment, the electrode 130 may be suspended above the top surface 110 of the sensing element 104 by forming the electrode 130 on a sacrificial layer (not shown) during manufacturing. In such an embodiment, the sacrificial layer may be removed prior to operation of the gas detector 100, during manufacturing. In one embodiment, the electrode 130 may be bonded to the substrate 104. In some embodiments utilizing electrode 130, the electrode 130 may be fabricated from silicon. In some embodiments utilizing electrode 130, the electrode 130 may be perforated to allow the target gas to reach the sensing element 104 through the electrode 130.

Figure 5:
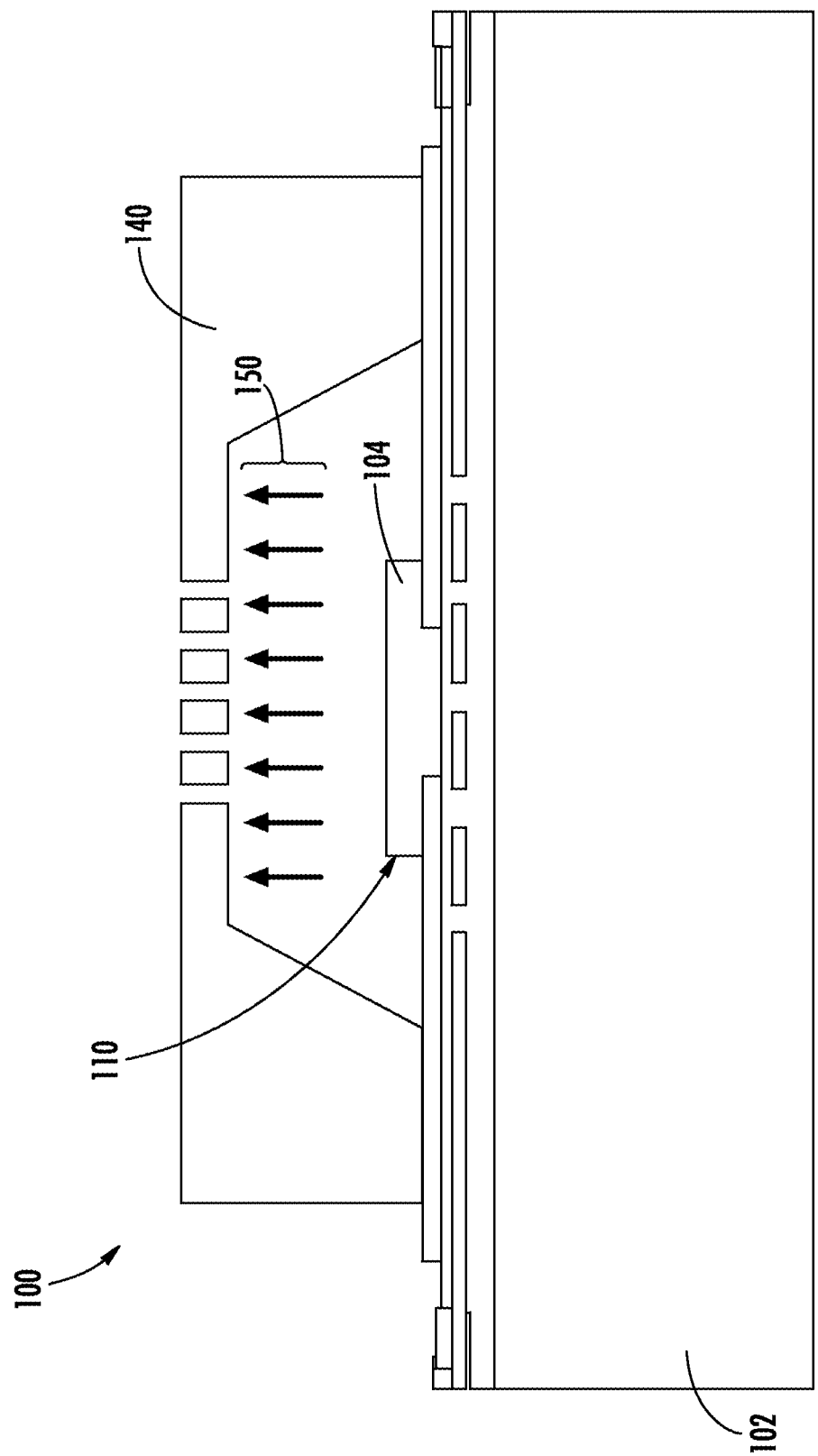
FIG. 5 is a schematic view of a gas detection device according to an embodiment having a perforated electrode.

In one embodiment, a support 140, shown in FIG. 5, may include the electrode 130 (not shown in FIG. 5). In some embodiments, the support 140 may be a grid or floating plate, i.e. a physically suspended plate above the surface 110 of the sensing element 104. In such an embodiment, the support 140 may be perforated to allow the target gas to reach the sensing element 104. In one embodiment, the support may be formed from any appropriate material, including, but not limited to metals and foils.

The embodiments, described herein enable the dopant 108 to be located at or near the top surface 110 of the sensing element 104, where the dopant 108 facilitates improving sensing element 104 performance, thereby facilitating increasing the stability of the gas detector 100 in the field.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A gas detection device comprising:
   a substrate;
   a sensing element coupled to the substrate and constructed and arranged to sense a target gas;
   a top surface positioned on the sensing element opposite the substrate;
   a dopant disposed within the sensing element, the dopant enhancing the ability of the sensing element to sense the target gas;
   an electric field applied to the dopant to constrain the dopant at or near the top surface of the sensing element;
   a support which is a physically suspended plate above the top surface, wherein the support is perforated to allow the target gas to reach the sensing element; and
   an electrode retained within the support, the electrode being biased to form the electric field.

2. The gas detection device of claim 1, wherein the electric field is at least one of static or pulsed.

3. The gas detection device of claim 1, wherein the electric field is time-varying.

4. The gas detection device of claim 1, wherein the substrate is biased to form the electric field within the sensing element.

5. A method of operating a gas detection device comprising:
   providing a substrate;
   coupling a sensing element to the substrate, wherein the sensing element is constructed and arranged to sense a gas, the sensing element having a top surface;
   impregnating the sensing element with a dopant, the dopant enhancing the ability of the sensing element to sense the gas;
   applying an electric field to the dopant to constrain the dopant at or near the top surface of the sensing element;
   providing a support which is a physically suspended plate above the top surface, wherein the support is perforated to allow the target gas to reach the sensing element; and
   retaining an electrode within the support;
   biasing the electrode to form the electric field.

6. The method of claim 5, wherein the electric field comprises a static electric field or a pulsed electric field.

7. The method of claim 5, wherein the electric field comprises a time-varying electric field.

8. The method of claim 5 further comprising electrically biasing the substrate to form the electric field within the sensing element.

* * * * *